US012752685B2

(12) United States Patent
Abdella et al.

(10) Patent No.: US 12,752,685 B2
(45) Date of Patent: Oct. 6, 2026

(54) TRAPPED TAB ATTACHMENT ASSEMBLIES AND METHODS

(71) Applicant: LEAR CORPORATION, Southfield, MI (US)

(72) Inventors: David J. Abdella, Farmington Hills, MI (US); Samuel Blair, Rochester, MI (US)

(73) Assignee: Lear Corporation, Southfield, MI (US)

( * ) Notice: Subject to any disclaimer, the term of this patent is extended or adjusted under 35 U.S.C. 154(b) by 99 days.

(21) Appl. No.: 18/986,083

(22) Filed: Dec. 18, 2024

(65) Prior Publication Data

US 2026/0167072 A1 Jun. 18, 2026

(51) Int. Cl.
*B60N 2/56* (2006.01)
*B60N 2/66* (2006.01)
*B60N 2/90* (2018.01)
*A47C 7/46* (2006.01)
*A47C 7/74* (2006.01)

(52) U.S. Cl.
CPC ........... *B60N 2/5678* (2013.01); *B60N 2/665* (2015.04); *B60N 2/976* (2018.02); *A47C 7/467* (2013.01); *A47C 7/748* (2013.01)

(58) Field of Classification Search
CPC ...... B60N 2/5678; B60N 2/976; B60N 2/665; A47C 7/74; A47C 7/748; A47C 7/767
See application file for complete search history.

(56) References Cited

U.S. PATENT DOCUMENTS 7,147,279 B2 * 12/2006 Bevan .................. B60N 2/5685 297/284.6
2007/0296251 A1 * 12/2007 Krobok .................... A47C 7/74 297/180.11
2011/0133524 A1 * 6/2011 Cheng .................... A47C 7/467 297/230.13

* cited by examiner

*Primary Examiner* — Syed A Islam
(74) *Attorney, Agent, or Firm* — Carlson, Gaskey & Olds, P.C.

(57) ABSTRACT

An assembly may include a pneumatic assembly including one or more tabs, a heat mat, and an intermediate layer disposed between the pneumatic assembly and the heat mat and including one or more apertures. The one or more tabs are received through the one or more apertures, and the heat mat is adhered to the intermediate layer and the one or more tabs.

20 Claims, 6 Drawing Sheets

TRAPPED TAB ATTACHMENT ASSEMBLIES AND METHODS

BACKGROUND

Vehicle seat assemblies may be provided with trim covers and other components positioned over cushions.

DETAILED DESCRIPTION

Figure 1:
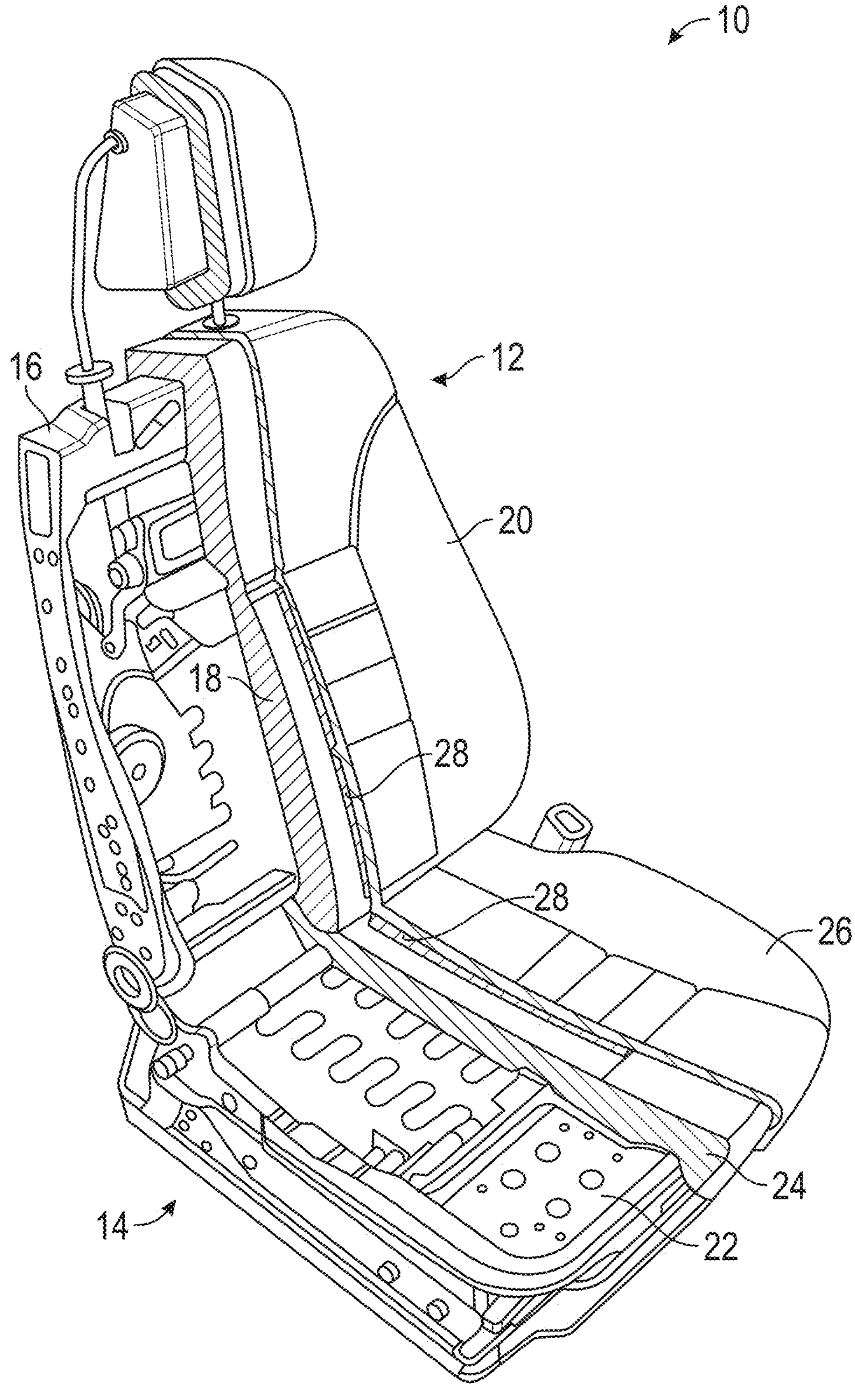
FIG. 1 is a perspective view of an example seat.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

It should be understood that terms such as "about," "substantially," and "generally" are not intended to be boundaryless terms, and should be interpreted consistent with the way one skilled in the art would interpret those terms.

This disclosure relates generally to multi-layer assembly techniques. More specifically, this disclosure relates to assemblies and methods for attaching multiple layers to one another by trapping a tab of one layer against another layer.

FIG. 1 illustrates an example seat assembly 10. The seat assembly 10 may be utilized as a vehicle seat assembly 10 for seating in a vehicle, such as an automobile, an aircraft, a watercraft, or any other seating environment. In this example, the seat assembly 10 includes a seat back 12 and a seat bottom 14, which may be adapted to be mounted for motor-driven adjustable translation in a fore and aft direction and in an up and down direction of a vehicle. The seat back 12 includes a seat frame 16. The seat back 12 may be pivotally connected to the seat bottom 14 to extend generally upright relative to the seat bottom 14 for pivotal adjustment about an axis relative to the seat bottom 14. The seat frame 16 supports a cushion 18, which is covered by a trim cover assembly 26. The seat bottom 14 likewise includes a seat frame 22, which supports a cushion 24.

In some implementations, the seat assembly 10 may be shaped and sized as a front row driver or passenger seat, a second, third, or other rear row seat, and may include bench-style seats, bucket seats, or other seat styles. Furthermore, the seat assembly 10 may be a non-stowable seat or a stowable seat that may be foldable and stowable in a cavity in the vehicle floor. Additionally, the seat assembly 10 may be configured for use with other non-vehicle applications.

The seat frame 16 may be made of metal, plastic, wood, or a combination thereof. The seat frame 16 may be made of steel and/or aluminum in some implementations.

The seat bottom 14 may be configured to support a seat occupant. In a vehicular application, the seat bottom 14 may be mounted to a support surface, such as a vehicle floor. It should be understood that this is just one example of a seat configuration, and that other configurations could also be utilized.

Each cushion 18, 24 may be one or more foam parts, joined together to form the seat component. For example, the seat back cushion 18 may include a main seating portion and various bolster portions. The cushions 18, 24 can have any suitable size and be formed from any suitable configuration of components. In implementations, the cushions 18,24 form a contoured shape, e.g., a concave shape, for a corresponding occupant seating surfaces, with the concavity of the cushions 18, 24 improving occupant comfort and aesthetic styling of the seat assembly 10. The cushions 18, 24 can independently comprise any suitable comfort foam material such as, but not limited to, a suitable resilient polymer, and can independently be formed in any suitable manner. For example, the cushions 18, 24 may be formed of conventional polyurethane foam, soy-based foam, silicone, thermoplastic olefins, thermoplastic urethanes, and/or natural oil-based expanded polyurethanes, soy-based polyurethane, polymer fibers, non-woven polyester pads, latex foams and the like. The cushions 18, 24 are formed of any suitable comfort material that provides soft resilience as the seat assembly is deflected during use when an occupant is in a seated position.

In implementations, one or more cushions 18, 24 may be provided, where at least one of the cushions 18, 24 is formed of a non-foam material. In at least one embodiment, the non-foam material is formed from strands of thermoplastic resin, for example, a linear low-density polyethylene (LLPDE) material, although other polymers and materials effective to provide the desired properties and functionality are contemplated, such as, but not limited to polyamide-based, polyester-based, polyimide-based, polyolefin-based (e.g., polypropylene-based, polyethylene-based, etc.), polystyrene-based, or combinations thereof. At least one of the strands is looped and bonded to at least one other strand, which forms a three-dimensional structure. The use of thermoplastic has several advantages over traditional polyurethane foam, such as reduced toxicity, reduced weight, reduced production costs and increased recyclability. As would be understood, the material properties of the resin may be adjusted to change the material hardness and, therefore, the resulting firmness of the resulting cushion. Similarly, the density and orientation of the strands may be adjusted to change the firmness of the resulting cushion, the porosity and, therefore, resulting airflow through the material, etc.

In at least one embodiment, the strands of thermoplastic material are extruded. A container holding beads, granules, flakes, pellets, or powder of the resin dispenses the material, which is then melted and extruded through a die head. The dimensions and orientation of the holes through which the melted resin is extruded may be changed to achieve different properties of the resulting cushion. The extruded strands are then deposited in a water bath, which serves to loop and bond at least one of the strands to another of the strands to form a mesh, as well as begin the cooling process to return the strands from a molten to a hardened state. The distance of the die head from the water bath may be adjusted to affect the diameter of the resin strands, e.g., due to the thinning that occurs when the filaments extend over an increased distance and the material is in a molten, non-hardened state. The water bath may be provided with various rollers and conveyors to move the filaments through and out of the water bath, and the filament structure may be cut to a desired sized and shape to form a cushion blank, e.g. using a cutting wheel, a water jet, or another technique.

The result of the process is, in one embodiment, a mesh structure of relatively uniform dimensions, e.g., a rectangular block or prism. In other embodiments, the strands can be manipulated during any step in the process to produce a mesh structure with features, such as contours, notches, trenches, skins, etc. The manipulations, for example, include changing the speed of the extrusion, changing the speed that the strands are extracted from the water bath, introducing streams of air or water blown onto the strands before they reach the water bath, perturbations of the water bath, adding layers of permeable or impermeable material, etc.

In some embodiments, the mesh structure may be further processed to introduce new shapes and features to the mesh. For example, in one embodiment, the mesh structure is cut into blanks that are placed in molds. To more permanently configure the shape of the blank, the cushion blank is heated to a temperature where the polymeric material from which it is made begins to soften. The control of temperatures and other manufacturing processes may result in some limited, unintentional localized melting of the polymeric material, but if this occurs, it would be negligible, and most of the cushion blank would remain in a non-liquid state. Therefore, the cushion blank begins the molding process in a solid state, and mostly or completely remains in a solid-state throughout the process. In one embodiment this is achieved by passing a first fluid having a first predetermined temperature through the mold, and through the cushion blank itself. This introduces a first fluid flow through the cushion blank to bring it to a desired temperature.

The fluid in the fluid flow may be a gas, a liquid, or some combination of gas and liquid. For example, the fluid may be air, steam, super-heated steam, water, etc. The first predetermined temperature will depend on the specific material from which the cushion blank 12 is manufactured. For example, for a stranded-mesh material made from linear low-density polyethylene, such as described above, the first predetermined temperature may be in the range of 85-100 C. Other types of polymeric materials may have different temperature ranges in which they become compliant—e.g., for a high-density polyethylene or a polypropylene, the first predetermined temperature may be 100-130 C.

Because the cushion blank is made from a stranded-mesh material, the heated air flows generally uniformly throughout the entire thickness of the blank. This helps to ensure uniform heating so that all the material in the cushion blank becomes compliant.

A second fluid may, subsequently, be passed through the mold to effect cooling of the cushion and harden the cushion to the mold shape. The second fluid air, steam, super-heated steam, water, etc.

In implementations, a trim cover 26 may be disposed over or upon the cushions 18, 24. The trim cover 26 provides at least a portion of a visible exterior surface of the seat assembly 10. In implementations, the trim cover 26 may include a plurality of trim panels that may be assembled in any suitable manner, such as by stitching. The trim panels may be made of any suitable material or materials, such as a fabric, woven fabric, faux leather, or leather surface; includes cotton, polyester, polyurethane, nylon, or any other suitable material, or combinations thereof. The trim cover 26 may be the outermost layer of the seat assembly 10. The trim cover 26 may provide a seating surface for the seat assembly 10. The trim cover 26 may be formed from one or more trim panels of a fabric, leather, leatherette, vinyl, or other upholstery material. Two adjacent trim panels may be sewn or otherwise connected to one another, e.g. via welding or the like, along a seam.

As shown schematically, a subassembly 28 of one or more layers may be provided between the trim cover 26 and the cushions 18, 24. In implementations, the subassembly 28 may include one or more of a heat mat, a pneumatic assembly, and one or more foam layers.

Figure 2:
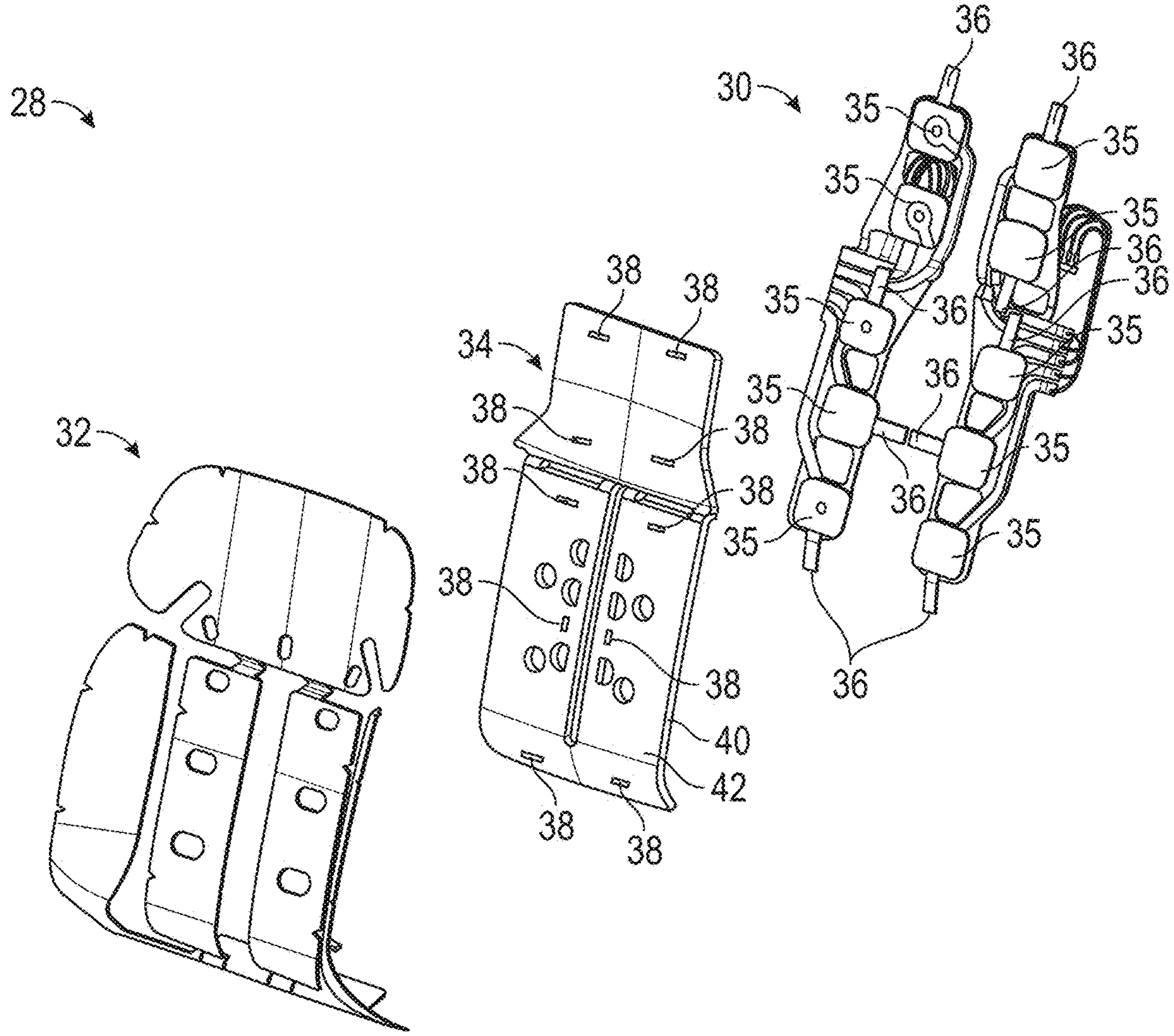
FIG. 2 illustrates an exploded view of an example subassembly including three layers.

FIG. 2 illustrates an exploded view of an example subassembly 28 including three layers 30, 32, 34. In implementations, as shown, the layers include a pneumatic assembly 30, a heat mat 32, and an intermediate layer 34 therebetween. Although an example layer arrangement is provided, other layer types and arrangements may benefit from this disclosure. More or fewer layers may be provided in the subassembly 28.

The pneumatic assembly 30 may be may be a massage assembly including one or more massage bladders 35 for providing a massage to the vehicle occupant.

The heat mat 32 may provide warmth and comfort to the vehicle occupant. The heat mat 32 may include a thin, flexible heating element, and, when activated, may generate heat that radiates through the seat surface, warming the occupant. In implementations, the heat mat 32 may include polyester felt. In implementations, the heat mat 32 may include unreticulated foam with scrim, such as warp knit or circular scrim.

The intermediate layer 34 may include foam (e.g., a foam topper). In implementations, the intermediate layer 34 may be a foam layer formed by a die cutting process.

The pneumatic assembly 30 may include one or more protruding tabs 36. The tabs 36 could be flexible or rigid. In implementations, the tabs 36 could be provided at one or more locations of the pneumatic assembly (e.g., upper, lower, middle, left, center, middle), such as to distribute mechanical loads. As shown, some tabs 36 may be oriented transversely to other tabs 36. As shown, some tabs 36 may extend in opposite directions relative to other tabs 36. The intermediate layer 34 may include one or more apertures 38 for receiving the tabs 36 therethrough for attachment of the pneumatic assembly 30 to the intermediate layer 34. The apertures 38 may be positioned to align with the tabs 36 when the pneumatic assembly 30 and the intermediate layer 34 are properly aligned. In implementations, the apertures 38 may be slits sized so that the one or more tabs 36 can be received therein. The tabs may be a variety of shapes, including rectangular, round, square, and/or arrow shaped in implementations.

The intermediate layer may include a first surface 40 and a second surface 42 opposite the first surface 40, with the first surface 40 abutting the pneumatic assembly 30. In implementations, the first surface 40 may be nearer the pneumatic assembly 30 than the heat mat 32. The one or more apertures 38 may be through openings through the first and second surfaces 40, 42. Although a pneumatic assembly and intermediate layer are disclosed in an illustrative example, in implementations, other types of layers may provide the tabs 36 and or apertures 38.

Figure 3:
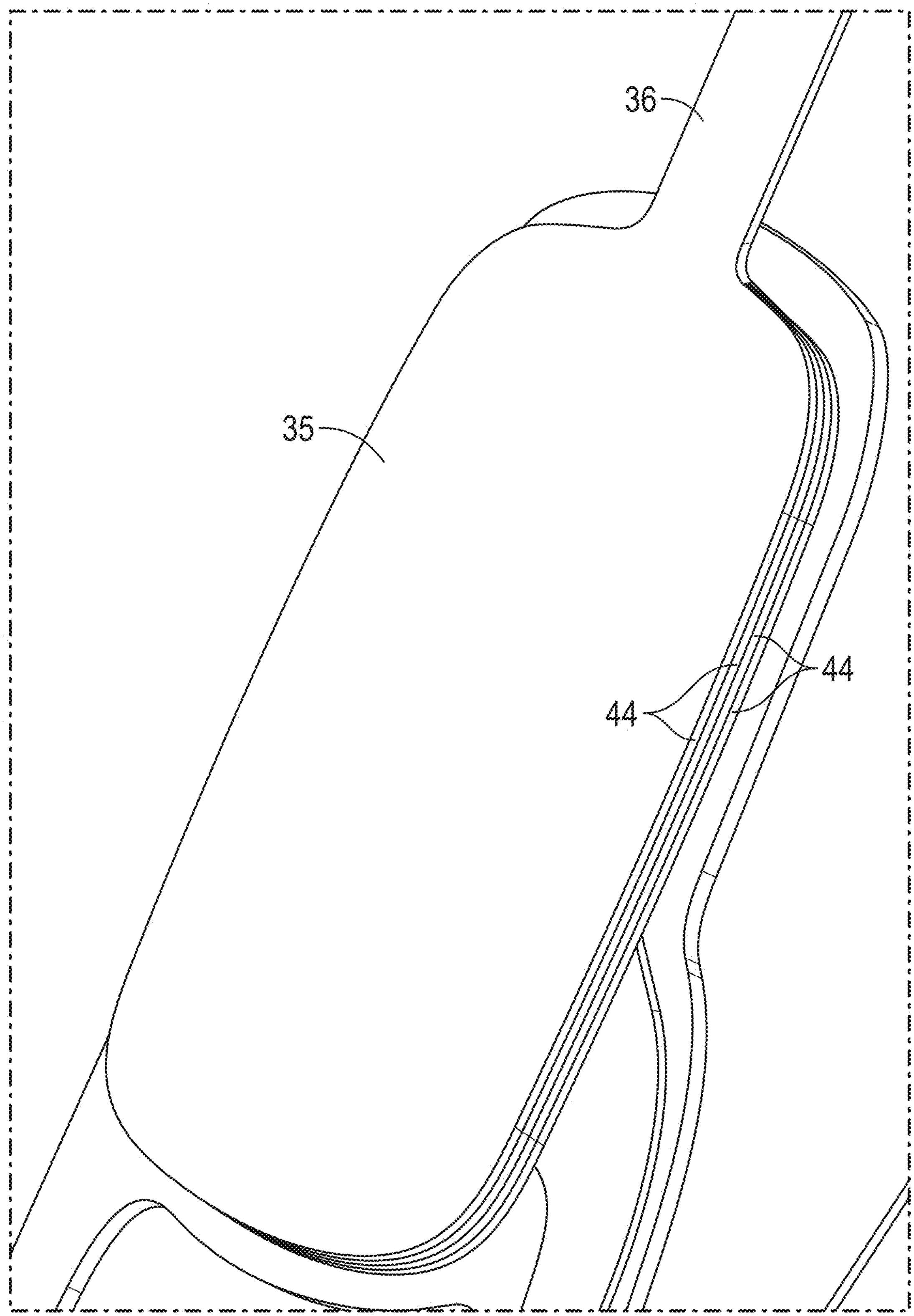
FIG. 3 illustrates an example massage bladder and tab.

As shown in FIG. 3, in implementations, the massage bladders 35 may be formed by one or more layers 44, and one or more tabs 36 may be an extension of one of the layers 44.

Figure 4A:
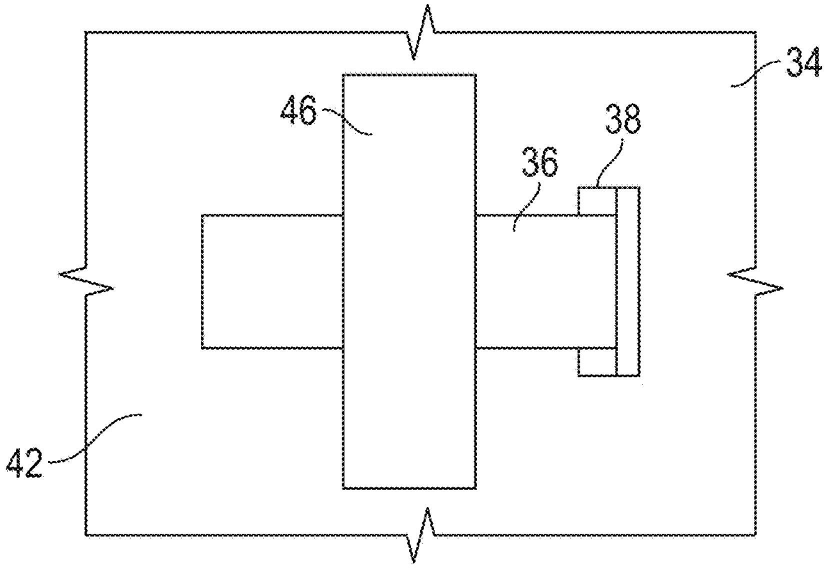
FIG. 4A illustrates a portion of the example subassembly including a tab.
Figure 4B:
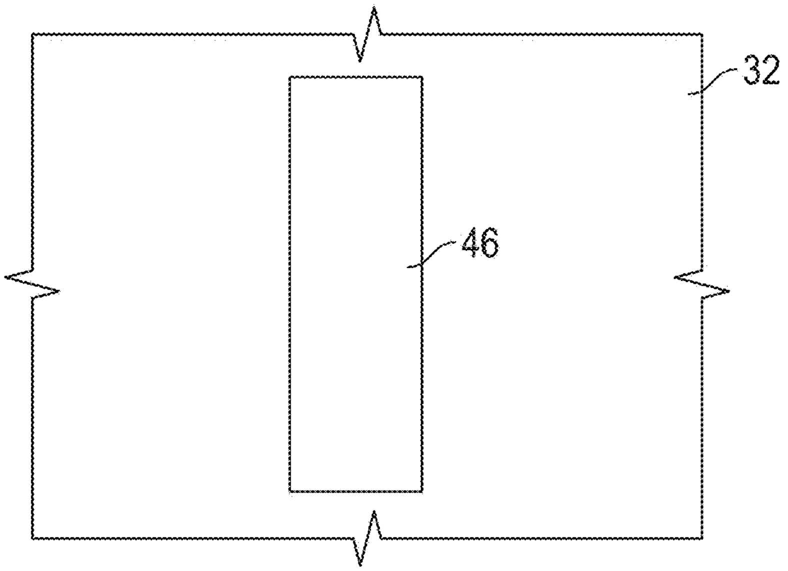
FIG. 4B illustrates another portion of the example subassembly including a heat mat.
Figure 4C:
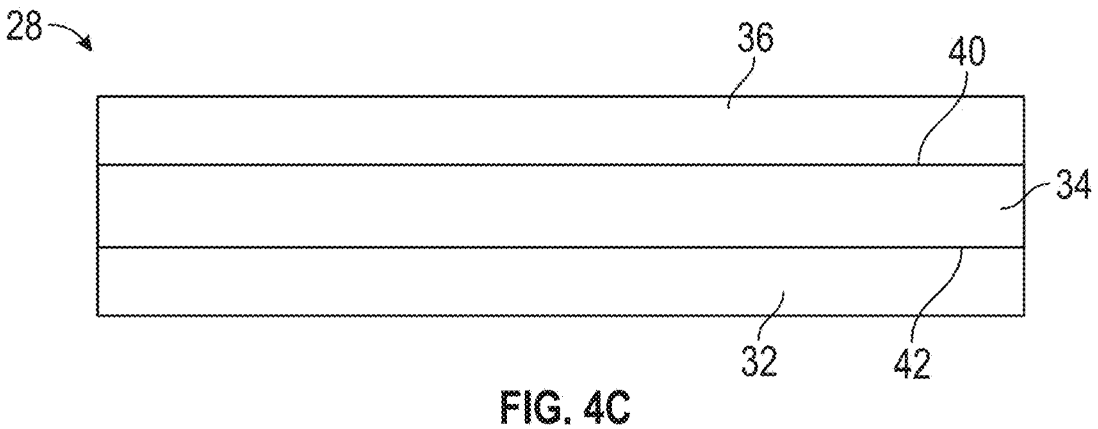
FIG. 4C schematically illustrates stacked layers of the example subassembly.

As shown in FIGS. 4A-4C, the one or more tabs 36 may be pulled through a corresponding aperture 38, completely or partially, and adhered against the second surface 42. In implementations, one or more tape strips 46 may be utilized over the tab 36. In implementations, the tabs 36 may be folded or otherwise oriented to abut the second surface 42 and/or to avoid crossing a feature of the intermediate layer 34 (e.g., an air hole) before adhesion. The tape strips 46 may also be adhered to the second surface 42 as shown, as well as the underside of the heat mat 32 (see FIG. 4B). In implementations, the tape strips 46 may be a form of double-sided tape. Although tape strips are disclosed as an example, many forms of adhesive, including but not limited to pressure-sensitive adhesive, heat sealing or thermal adhesion, spray adhesive, lamination or mechanical adhesion, may be utilized. In implementations, the choice of adhesive may depend on the materials used in the layers. In implementations, the tab 36 may be of a shape that prevents the tab from being easily pulled back out of the slot, such that adhesive may not be utilized.

The heat mat 32 may be adhered to the tabs 36 and the second surface 42, such that the pneumatic assembly 30, the intermediate layer 34, and the heat mat 32 are attached to one another, forming the subassembly 28. The subassembly 28 may then be attached to a vehicle seat. With reference to FIG. 1, the subassembly 28 may be attached to a seat cushion 18, 24, between the seat cushion 18, 24 and the trim cover 26.

Figure 5A:
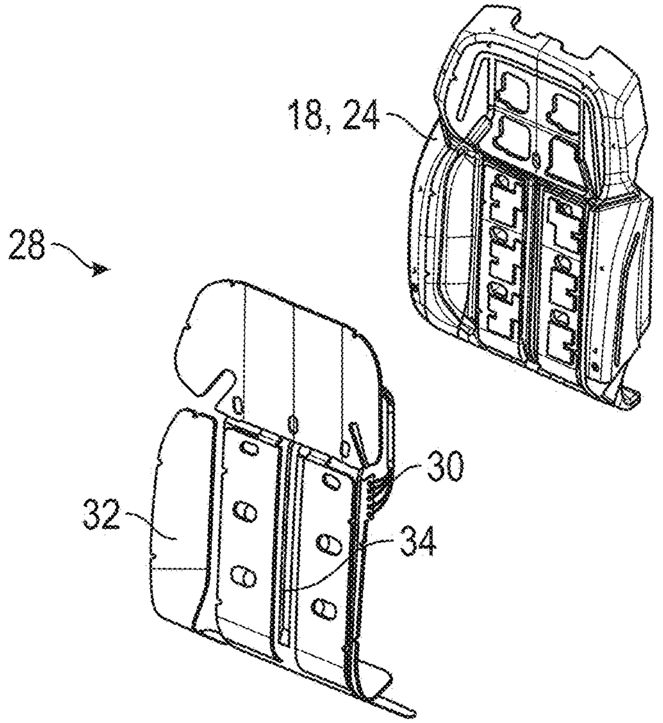
FIG. 5A illustrates an exploded view of the subassembly and a seat cushion.
Figure 5B:
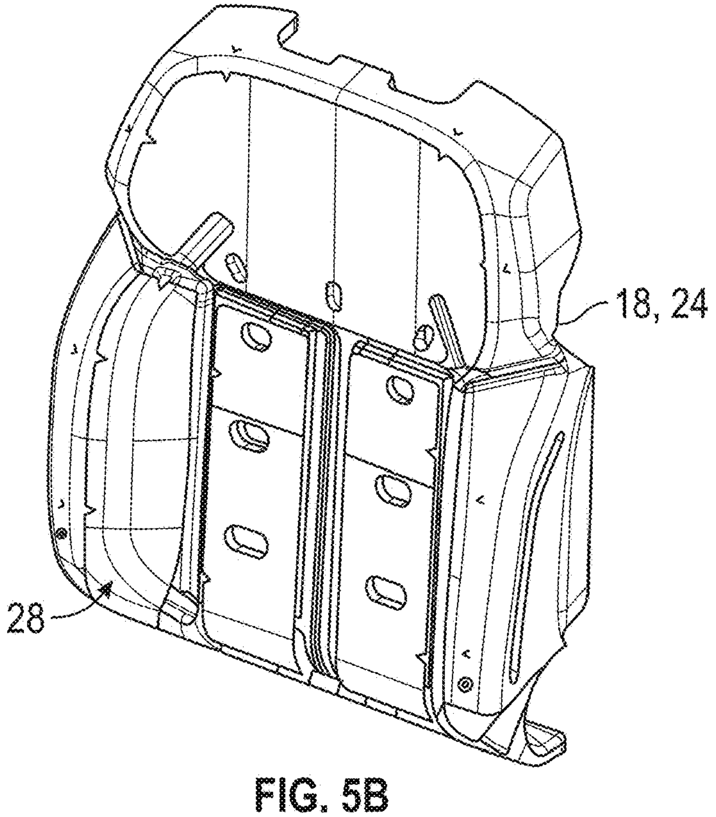
FIG. 5B illustrates the example subassembly attached to a seat cushion.

FIG. 5A illustrates an exploded view of the subassembly 28 (with the layers 30, 32, 34 attached to one another) and a seat cushion 18, 24. In implementations, the heat mat 32 may be adhered to the cushion 18, 24, with the pneumatic assembly 30 and the intermediate layer 34 therebetween, as shown in FIG. 5B.

Figure 6:
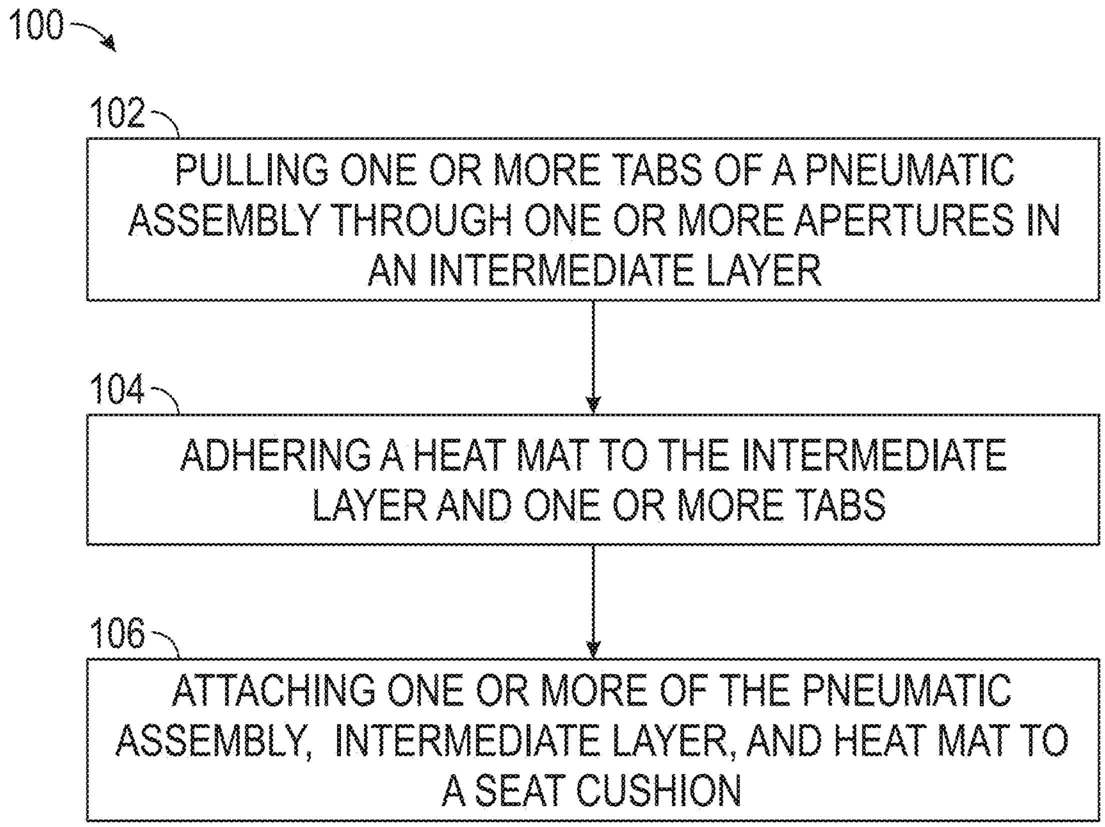
FIG. 6 illustrates a flowchart of an example method.

FIG. 6 illustrates a flowchart of an example method 100 that may be utilized with any of the assemblies disclosed herein. Fewer or additional steps than are recited below could be performed within the scope of this disclosure, and the recited order of steps is not intended to limit this disclosure. At step 102, one or more tabs of a pneumatic assembly are pulled through one or more apertures in an intermediate layer. At step 104, a heat mat is adhered to the intermediate layer and the one or more tabs.

At step 106, one or more of the pneumatic assembly, intermediate layer, and heat mat may be attached to a seat cushion. In implementations, step 102 may be performed before step 104. In implementations, steps 102 and 104 may be performed before step 106.

An example assembly according to this disclosure may be said to include a first layer including one or more tabs; a second layer; and a third layer disposed between the first layer and the second layer and including one or more apertures. The one or more tabs are received through the one or more apertures, and the second layer is adhered to the third layer and the one or more tabs.

An example method according to this disclosure may be said to include pulling one or more tabs of a first layer through one or more apertures in a second layer; and adhering a third layer to the second layer and the one or more tabs. The method may further include attaching one or more of the first, second, and third layer to a seat cushion.

In prior art assemblies and methods, the seat cushion would provide a build surface for various layers. The assemblies and methods disclosed allow for a subassembly of layers to be formed and secured to one another without access to the cushion in some implementations. For example, the subassembly could be formed at a different location from where the seat is assembled. Less adhesive may be used in some of the assemblies and methods disclosed herein relative to prior art assemblies and methods. The mechanical interlocking of the tabs and apertures may provide increased securement and durability relative to using adhesive alone. Additional fastening hardware may not be needed.

In implementations, an assembly includes a pneumatic assembly including one or more tabs; a heat mat; and an intermediate layer disposed between the pneumatic assembly and the heat mat and including one or more apertures. The one or more tabs are received through the one or more apertures, and the heat mat is adhered to the intermediate layer and the one or more tabs.

In implementations, the pneumatic assembly is a massage assembly including at least one bladder.

In implementations, the at least one bladder is formed of a plurality of layers, and the one or more tabs includes a tab that is an extension of one of the plurality of layers.

In implementations, the assembly includes a seat including a cushion, and the pneumatic assembly is disposed on the cushion. In implementations, the assembly includes a seat including a cushion, wherein the heat mat is adhered to the cushion.

In implementations, the intermediate layer includes foam, and the one or more apertures include one or more slits.

In implementations, the intermediate layer includes a first surface and a second surface opposite the first surface, the first surface abuts the pneumatic assembly, and the one or more tabs are folded against the second surface.

In implementations, the heat mat is adhered to the second surface.

In implementations, the intermediate layer includes foam, and the one or more apertures include one or more slits.

In implementations, the assembly includes a seat including a cushion, and the heat mat is adhered to the cushion.

In implementations, the pneumatic assembly is a massage assembly including at least one bladder, the at least one bladder is formed of a plurality of layers, and the one or more tabs includes a tab that is an extension of one of the plurality of layers.

In implementations, a method includes pulling one or more tabs of a pneumatic assembly through one or more apertures in an intermediate layer; and adhering a heat mat to the intermediate layer and the one or more tabs.

In implementations, the method includes attaching the heat mat to a seat cushion. In implementations, the adhering step is performed before the attaching step. In implementations, the pulling step is performed before the adhering step.

In implementations, the intermediate layer includes a first surface and a second surface opposite the first surface, the method including: positioning the one or more tabs against the second surface with the pneumatic assembly received against the first surface.

In implementations, the adhering step includes adhering the heat mat to the second surface. In implementations, the method includes attaching the heat mat to a seat cushion.

In implementations, the pneumatic assembly is a massage assembly including at least one bladder, the at least one bladder is formed of a plurality of layers, and the one or more tabs includes a tab that is an extension of one of the plurality of layers.

In implementations, the adhering step includes applying one or more tape strips.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An assembly, comprising:
a pneumatic assembly including one or more tabs;
a heat mat; and
an intermediate layer disposed between the pneumatic assembly and the heat mat and including one or more apertures, wherein the one or more tabs are received through the one or more apertures, and the heat mat is adhered to the intermediate layer and the one or more tabs.

2. The assembly of claim 1, wherein the pneumatic assembly is a massage assembly including at least one bladder.

3. The assembly of claim 2, wherein the at least one bladder is formed of a plurality of layers, and the one or more tabs includes a tab that is an extension of one of the plurality of layers.

4. The assembly of claim 1, comprising:
a seat including a cushion, wherein the pneumatic assembly is disposed on the cushion.

5. The assembly of claim 1, comprising:
a seat including a cushion, wherein the heat mat is adhered to the cushion.

6. The assembly of claim 1, wherein the intermediate layer comprises foam, and the one or more apertures include one or more slits.

7. The assembly of claim 1, wherein the intermediate layer includes a first surface and a second surface opposite the first surface, the first surface abuts the pneumatic assembly, and the one or more tabs are positioned against the second surface.

8. The assembly of claim 7, wherein the heat mat is adhered to the second surface.

9. The assembly of claim 8, wherein the intermediate layer comprises foam, and the one or more apertures include one or more slits.

10. The assembly of claim 9, comprising:
a seat including a cushion, wherein the heat mat is adhered to the cushion.

11. The assembly of claim 10, wherein the pneumatic assembly is a massage assembly including at least one bladder, the at least one bladder is formed of a plurality of layers, and the one or more tabs includes a tab that is an extension of one of the plurality of layers.

12. A method, comprising:
pulling one or more tabs of a pneumatic assembly through one or more apertures in an intermediate layer; and
adhering a heat mat to the intermediate layer and the one or more tabs.

13. The method of claim 12, comprising:
attaching the heat mat to a seat cushion.

14. The method of claim 13, wherein the adhering step is performed before the attaching step.

15. The method of claim 12, wherein the pulling step is performed before the adhering step.

16. The method of claim 12, wherein the intermediate layer includes a first surface and a second surface opposite the first surface, the method comprising:
positioning the one or more tabs against the second surface with the pneumatic assembly received against the first surface.

17. The method of claim 16, wherein the adhering step includes adhering the heat mat to the second surface.

18. The method of claim 16, comprising:
attaching the heat mat to a seat cushion.

19. The method of claim 12, wherein the pneumatic assembly is a massage assembly including at least one bladder, the at least one bladder is formed of a plurality of layers, and the one or more tabs includes a tab that is an extension of one of the plurality of layers.

20. The method of claim 12, wherein the adhering step includes applying one or more tape strips.

* * * * *